(12) United States Patent
Abraham

(10) Patent No.: US 11,415,155 B2
(45) Date of Patent: Aug. 16, 2022

(54) INDUSTRIAL APPARATUS COMPRISING A PNEUMATIC CONTROL VALVE

(71) Applicant: Volvo Truck Corporation, Gothenburg (SE)

(72) Inventor: Lionel Abraham, Oullins (FR)

(73) Assignee: Volvo Truck Corporation, Gothenburg (SE)

( * ) Notice: Subject to any disclaimer, the term of this patent is extended or adjusted under 35 U.S.C. 154(b) by 214 days.

(21) Appl. No.: 16/765,296

(22) PCT Filed: Nov. 20, 2017

(86) PCT No.: PCT/IB2017/001634
§ 371 (c)(1),
(2) Date: May 19, 2020

(87) PCT Pub. No.: WO2019/097273
PCT Pub. Date: May 23, 2019

(65) Prior Publication Data
US 2020/0284272 A1   Sep. 10, 2020

(51) Int. Cl.
*F15B 13/07* (2006.01)
*B62D 1/184* (2006.01)
(Continued)

(52) U.S. Cl.
CPC ............. *F15B 13/07* (2013.01); *B62D 1/184* (2013.01); *F15B 11/20* (2013.01); *F15B 13/16* (2013.01);
(Continued)

(58) Field of Classification Search
CPC .......... F15B 13/07; F15B 11/20; F15B 13/16; F15B 2013/0412; F15B 2211/30585; F15B 2211/783; B62D 1/184
See application file for complete search history.

(56) References Cited

U.S. PATENT DOCUMENTS

2002/0056363 A1* 5/2002 Leeman .................. F15B 11/20
91/508
2014/0047941 A1 2/2014 Park
(Continued)

FOREIGN PATENT DOCUMENTS

DE           2537003 A1    10/1976
DE     102017106859 A1 *  10/2018 ............. F15B 13/04
(Continued)

OTHER PUBLICATIONS

International Search Report and Written Opinion for International Patent Application No. PCT/IB2017/001634, dated Jul. 30, 2018, 8 pages.

*Primary Examiner* — Drew J Brown
(74) *Attorney, Agent, or Firm* — Withrow & Terranova, PLLC

(57) ABSTRACT

This industrial apparatus (2) comprises a pneumatic system (4), a first mechanical device (36) and a second mechanical device (38). The pneumatic system (4) includes: a first pneumatic actuator (6) for commanding the first mechanical device (36), a second pneumatic actuator (8) for commanding the second mechanical device (38), a pneumatic control valve (10) switchable between several states to command of the first and second actuators (6, 8). The control valve (10) comprises an actuation portion (56), movable in translation between: a resting position, corresponding to a first state (S1), a first pushed position, corresponding to a second state (S2), and a second pushed position, corresponding to a third state (S3). The first pushed position corresponds to an intermediary position between the resting position and the second pushed position.

15 Claims, 2 Drawing Sheets

(51) Int. Cl.
*F15B 11/20* (2006.01)
*F15B 13/16* (2006.01)
*F15B 13/04* (2006.01)

(52) U.S. Cl.
CPC ............... *F15B 2013/0412* (2013.01); *F15B 2211/30585* (2013.01); *F15B 2211/783* (2013.01)

(56) References Cited

U.S. PATENT DOCUMENTS

2020/0263711 A1* 8/2020 Crouzet ................. F15B 11/06
2021/0239139 A1* 8/2021 Fujiwara ............. F15B 13/0422

FOREIGN PATENT DOCUMENTS

| DE | 102018125162 A1 * | 4/2020 | |
|---|---|---|---|
| EP | 0465301 A1 | 1/1992 | |
| WO | WO-2017127678 A1 * | 7/2017 | .............. F15B 1/265 |

* cited by examiner

INDUSTRIAL APPARATUS COMPRISING A PNEUMATIC CONTROL VALVE

This application is a 35 USC 371 national phase filing of International Application No. PCT/IB2017/001634, filed Nov. 20, 2017, the disclosure of which is incorporated herein by reference in its entirety.

TECHNICAL FIELD OF THE INVENTION

The invention relates to an industrial apparatus comprising a pneumatic control valve. Embodiments of the present invention more specifically relate to an industrial vehicle comprising this pneumatic control valve.

BACKGROUND OF THE INVENTION

Industrial apparatuses, such as industrial vehicles or machine tools, are usually complex machines made of many subparts. These subparts may include mechanical devices, sometimes having an auxiliary function, which can be commanded by a user during operation of the industrial apparatus. This command is often done by means of a pneumatic system which can be controlled through a pneumatic control valve meant to be actuated directly by the operator, usually by hand or by foot.

In some cases, however, this control valve may need to be operated quite frequently, sometimes as much as a hundred times during the course of a single day. It is therefore important for this control valve to be easy to use.

SUMMARY OF THE INVENTION

The object of the present invention is therefore to provide an ergonomically improved pneumatic control valve.

To that end, the invention relates to an industrial apparatus according to claim 1.

Operation of the control valve is made easier due to the fact that the displacement of the actuation portion is done by translation along a same axis and also because the first pushed position corresponds to an intermediary position between the resting position and the second pushed position.

Additional embodiments, which are advantageous but not compulsory, are defined in the dependent claims 2 to 13.

BRIEF DESCRIPTION OF THE DRAWINGS

The invention will be better understood upon reading the following description, provided solely as an exemplary embodiment, and made in reference to the appended drawings, in which.

DETAILED DESCRIPTION OF SOME EMBODIMENTS

Figure 1:
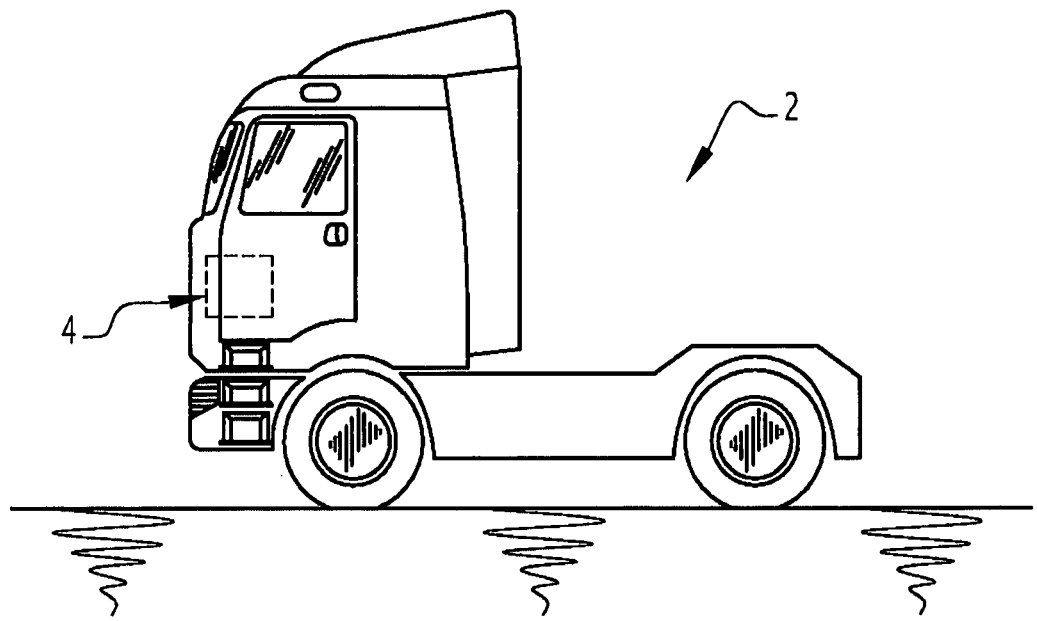
FIG. 1 is a diagram of an industrial vehicle comprising a pneumatic system and a pneumatic control valve according to embodiments of the invention.

FIG. 1 illustrates an industrial apparatus 2 comprising a pneumatic circuit 4. In this example, the industrial apparatus 2 is a semi-trailer truck which, in what follows, is simply referred to as "truck" and bears the reference 2.

However, the invention is not limited to a semi-trailer truck and can be applied more generally to an industrial vehicle, preferably a wheeled industrial vehicle. Examples of industrial vehicles include tractors, dump trucks, military vehicles, heavy-duty construction vehicles such as loaders, bulldozers, excavators, compactors, scrapers, and the like.

More generally, the invention can be applied to any kind of industrial apparatus, including machine tools and industrial production lines.

It is therefore understood that the semi-trailer truck 2 is merely an exemplary embodiment of an industrial apparatus, and that the embodiments and advantages of the invention described in what follows can be adapted mutatis mutandis to other types of industrial apparatuses 2.

Figure 2:
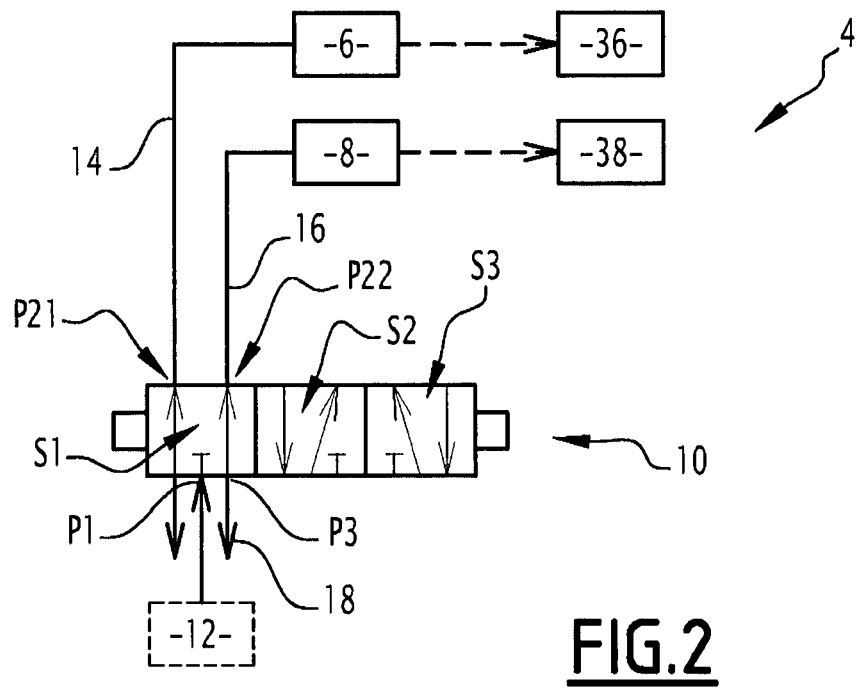
FIG. 2 is a simplified diagram of the pneumatic system of FIG. 1.
Figure 3:
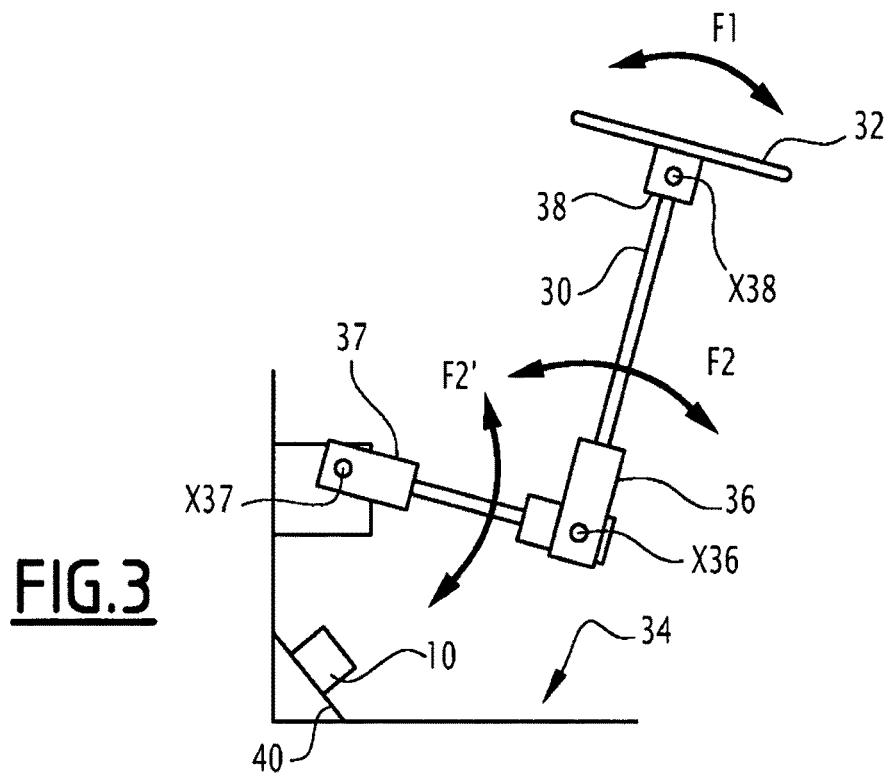
FIG. 3 is a simplified diagram of a steering column of the industrial vehicle of FIG. 1.
Figure 4:
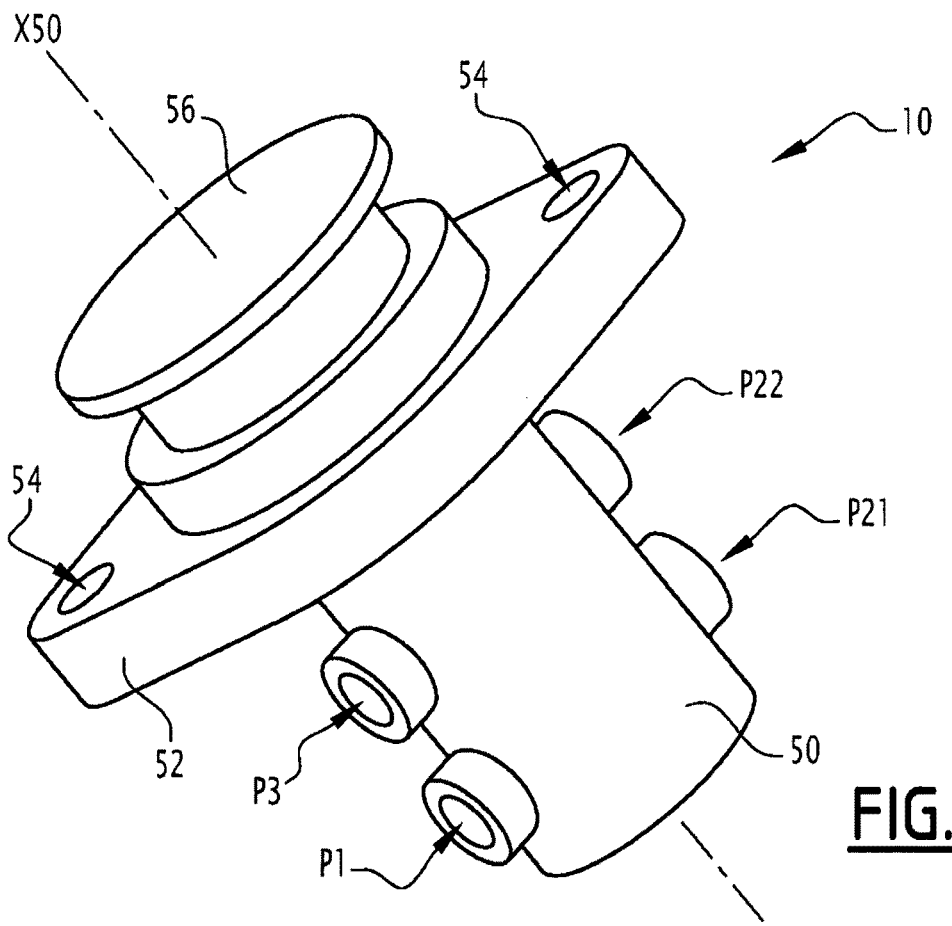
FIG. 4 is a simplified perspective view of an embodiment of the pneumatic control valve part of the pneumatic system of FIG. 2.

As illustrated in FIGS. 2, 3 and 4, the pneumatic circuit 4 includes a first pneumatic actuator 6, a second pneumatic actuator 8, and a pneumatic control valve 10.

The pneumatic circuit 4 is supplied by a compressed gas source 12.

For example, the source 12 is part of the truck 2 and includes a gas compressor and/or a compressed gas storage device, such as a tank.

According to some embodiments, the compressed gas is compressed air.

Each of the first and second actuators 6, 8 includes an input port fluidically connected to the control valve 10. In the illustrated example, these input ports are connected to the control valve 10 by means of ducts 14 and 16.

The pneumatic circuit 4 also includes an exhaust line 18, used for discharging compressed gas outside the pneumatic circuit 4.

Each of the first and second actuators 6, 8 can be switched between an activated state and an inactivated state, by providing it with compressed gas or, respectively, by connecting it with the exhaust line 18.

In this example, the first and second actuators 6, 8 are linear-type mechanical actuators, such as pneumatic cylinders. Other embodiments are however possible.

The first pneumatic actuator 6 is coupled to a first mechanical device 36 belonging to the truck 2. Similarly, the second pneumatic actuator 8 is coupled to a second mechanical device 38 belonging to the truck 2. For example, this coupling is mechanical.

The first and second mechanical devices 36, 38 can be switched between different states. For example, they are locking mechanisms. Examples are given in what follows.

Therefore, the first pneumatic actuator 6 can command the first mechanical device 36 and the second pneumatic actuator 8 can command the second mechanical device 38.

The control valve 10 includes first and second outlet ports P21, P22, a supply port P1 and an exhaust port P3.

The first and second outlet ports P21, P22 are connected to the input port, respectively, of the first and second actuator 6, 8. The supply port P1 is connected to the compressed gas source 12. The exhaust port P3 is connected to the exhaust line 18.

It follows that the control valve 10 is connected between actuators 6, 8 on a side and the source 12 and exhaust line 18 on the other side.

In the diagrammatic illustrations of FIG. 2, the control valve 10 is depicted with two ports P3 and two arrows illustrating the exhaust lines 18, but this is done to facilitate the understanding of the diagram. In practice, the control valve 10 may have only one exhaust port P3.

The control valve 10 is switchable between several states in order to command the operation of the first and second actuators 6, 8. Preferably, the control valve 10 is adapted to be switched between three different states, noted S1, S2 and S3 in what follows.

More precisely, the control valve 10 is adapted to selectively activate or inactivate each of the first and second actuators 6, 8. The control valve 10 activates each actuator by supplying said actuator (i.e. by supplying its input port) with compressed gas coming from the source 12, through the corresponding outlet port P21 or P22. The control valve 10 inactivates each actuator by connecting it to the exhaust line 18, through the corresponding outlet port P21 or P22 and the exhaust port P3. This activation or, alternatingly, inactivation, is done depending on the state of the control valve 10.

The control valve 10 is thus a three-state valve, here having one neutral state S1 and two excited states S2 and S3, also named control states, in which at least one of the first and second actuators 6, 8 is activated.

According to an embodiment, the first state S1 corresponds to an inactivated state of both first and second actuators 6, 8, in which no compressed gas is provided to the first and second actuators 6, 8. Instead, both are connected to the exhaust line 18. The second state S2 corresponds to an activated state of the second actuator 8 and to an inactivated state of the first actuator 6. The third state S3 corresponds to an activated state of the first actuator 6 and to an inactivated state of the second actuator 8.

Other arrangements are however possible according to alternative embodiments.

As an example, the control valve 10 illustrated in FIG. 2 is pictured in the first state S1.

The control valve 10 comprises an actuation portion 56, movable in translation, here along a translation axis X50, between:
- a resting position, corresponding to the first state S1,
- a first pushed position, corresponding to the second state S2, and
- a second pushed position, corresponding to the third state S3, One therefore understands that the control valve 10 can be set on one of the three predefined states S1, S2 and S3 by setting its actuating portion 56 in one of several predefined positions. In other words, a user can select one of the states S1, S2 and S3 by displacing the actuation portion 56 in the corresponding position.

In preferred embodiments, the first pushed position of the actuation portion 56 corresponds to an intermediary position between the resting position and the second pushed position.

To reach the first pushed position when starting from the resting position, the actuation portion 56 must be moved towards the first pushed position along the axis X50, by applying an actuation force.

To reach the second pushed position, the actuation portion 56 must first be moved towards the first pushed position along the axis X50, by applying an actuation force, and must be pushed further in the same direction towards the second pushed position, by continuing to apply the actuation force until the actuation portion 56 reaches the second pushed position.

According to some advantageous embodiments, the control valve 10 is adapted to oppose an increased mechanical resistance to displacement of the actuation portion 56 when the actuation portion 56 is moved from the first pushed position towards the second pushed position.

In other words, an increased actuation force must be applied to the actuation portion 56 when moving it from the first pushed position towards the second pushed position.

As an illustrative example, the actuation force required to reach the first pushed position is comprised between 80 N and 100 N. The actuation force required to reach the second pushed position is higher, for example comprised between 120 N and 200 N.

This arrangement provides a sensitive feedback to the user, indicating a change of state of the control valve 10. The user can feel the difference between the control states and can easily know which of the control states S2 or S3 is activated, even when the control valve 10 is outside the field of view. There is no need to provide a dedicated status indicator which would be costly and more complicated to install. This results in an easier and intuitive use of the control valve 10.

In the example above, the resting position corresponds to a stable position, in which the actuating portion 56 can remain when no actuating force is applied.

For example, to this end, the actuation portion 56 is spring biased in order to return to the resting position when no outside actuation force is exerted on the actuation portion 56. In other words, the control valve 10 comprises means for applying an elastic force on the actuation portion 56.

According to a possible embodiment, the control valve 10 includes one or several springs acting on the actuation portion 56. In other embodiments, the elastic force results from the action of the compressed gas coming from the source 12.

Referring now to FIG. 4, an illustrative generic example of the control valve 10 is described. However, it is understood that this example is not necessarily limiting and that the control valve 10 may be different, and especially may have a different outward appearance.

The control valve 10 includes a main body 50. The actuation portion 56 is movable relative to this main body 50. The main body 50 optionally includes guiding means, to guide the actuation portion 56 in translation along axis X50 relative to the main body 50 and, preferably, to prevent the actuation portion 56 from moving along other degrees of freedom.

For example, the main body 50 is made of metal or of a thermoplastic material. The actuation portion 56 is made of a thermoplastic material. Other materials can be used.

In preferred embodiments, the translation axis X50 is a longitudinal axis of the main body 50. For example, the main body 50 has an elongated shape, preferably a cylinder shape. The ports P1, P21, P22 and P3 are arranged on this main body 50.

In some embodiments, the control valve 10 also comprises a flange portion 52 extending perpendicularly to axis X50, and preferably located on an proximate end of the main body 50, beneath the actuation portion 56. The flange portion 52 is provided with orifices 54 for receiving fastening means, such as screws or rivets. This flange portion 52 can however be omitted.

In preferred embodiments, the actuation portion 56 comprises an outer surface arranged perpendicular to the translation axis X50, so as to be actuated by a hand or by a foot of a user. This outer surface may have a flat or essentially flat shape.

In some embodiments, the control valve 10 also includes a movable inner portion, not illustrated, and connected with the actuation portion 56, for example attached to the actuation portion 56. This movable inner portion can move by sliding inside an internal cavity of the main body 50 along the translation axis X50. The movable inner portion includes fluid conduction channels, so as to selectively connect together or obstruct some of the ports P1, P21, P22, P3 of the control valve 10, depending on the selected state S1, S2, S3 of the control valve 10. Other embodiments are possible.

Moving now to FIG. 3, exemplary embodiments are described in greater detail, in which the pneumatic circuit 4 is used for locking and unlocking a position adjustment system associated to a steering column of the truck 2.

In this embodiment, the control valve 10 is located in a driver cabin of the truck 2.

Preferably, the control valve 10 is placed in a driver cabin of the truck 2 so as to act as a pedal. For example, the control valve 10 is fixed on a floor of the driver cabin, preferably near a foot rest holder 40. In other embodiments, the control valve 10 can be placed on or near the truck's dashboard, so as to act as a manual button. The shape of the actuating portion 56 may then be adapted in consequence.

The truck 2 comprises a steering column 30 and a steering wheel 32.

The steering wheel 32 is coupled to the steering column 30 so that, when a driver imparts a rotational movement on the steering wheel 32, this causes the steering column 30 to rotate along its longitudinal axis and to transmit this rotation to a steering system of the truck 2. Their role is well known and is not described in further detail.

The steering column 30 and the steering wheel 32 are associated to a position adjustment system, so as to accommodate various preferences of a truck driver and to increase the driver's comfort. To this end, the truck 2 includes at least a first articulation and a second articulation, arranged on the steering column 30 and on the steering wheel 32.

The first articulation allows a pivoting movement F2 of the steering column 30, relative to a fixed frame 34 of the truck 2, around a first rotation axis X36. This pivoting movement F2 is different from a rotation of the steering column 30 around its longitudinal axis. The axis X36 is different from the longitudinal axis of the steering column 30.

The second articulation allows a tilting movement F1 of the steering wheel 32 relative to the steering column 30, around a second rotation axis X38.

This tilting movement F1 is different from the rotation of the steering wheel 32 imparted by a driver in order to steer the truck 2. The tilting movement F1 is also known as a "neck-tilt" movement. It may be used by the driver to change the orientation of a main geometrical plane of the steering wheel 32 relative to the steering column 30. The second rotation axis X38 is preferably located near a base of the steering wheel 32.

In the exemplary embodiment of FIG. 3, the truck 2 also includes an additional articulation which allows a further pivoting movement F2' of the steering column 30 relative to the fixed frame 34 around an additional rotation axis X37. The truck 2 also includes an additional locking mechanism 37 for locking and unlocking this additional articulation. In this example, the pivoting movement F2' permitted by the additional articulation allows a motion of the column 30 along with the first articulation and the steering wheel 32.

In some embodiments, this additional articulation can be omitted. In that case, the axis X37 and the additional locking mechanism 37 are omitted. For example, the first articulation associated to axis X36 is then mounted without degree of freedom relative to the fixed frame 34.

In some embodiments, the position adjustment system may include other additional elements, not illustrated, for adjusting the position of the steering column along other degrees of freedom, for example for translating the steering column. These other additional devices may be locked and unlocked using to the pneumatic circuit 4 or, alternatively, by other separate means.

As explained above, the pneumatic circuit 4 is used for locking and unlocking the position adjustment system.

In that case, the first mechanical device 36 and the second mechanical device 38 described above in a generic way actually correspond to locking mechanisms of the first and second articulations: the first mechanical device 36 is a locking mechanism of either one of the first articulation or the second articulation, and the second mechanical device 38 is a locking mechanism of the other articulation.

In this example, the first mechanical device 36 is a locking mechanism of the first articulation and the second mechanical device 38 is a locking mechanism of the second articulation.

For example, the first actuator 6 is adapted to unlock the locking mechanism 36 of the first articulation when it is in its activated state, and to keep said locking mechanism 36 locked when in its inactivated state. Similarly, the second actuator 8 is adapted to unlock the locking mechanism 38 of the second articulation when in its activated state, and to keep said locking mechanism 38 locked when in its inactivated state.

In the exemplary embodiment of FIG. 3, the additional locking device 37 is preferably coupled to the first locking device 36 so as to be commanded simultaneously by the pneumatic circuit 4.

The first state S1 of the control valve 10 is a neutral state in which no position adjustment is possible, and each of the states S2 and S3 is a control state in which the position can be adjusted along one degree of freedom.

Thanks to the arrangement described above, the position adjustment system of the steering column 30 and steering wheel 32 offers two degrees of freedom which can be unlocked independently from each other, using only one control valve 10.

The control valve 10 is simpler, cheaper, smaller, easier to install and easier to use than known pneumatic control devices.

More specifically, the control valve 10 is simple and intuitive to use and does not require a precise movement to select any of the control states S2 or S3. These states S2 or S3 can be selected simply by pushing the actuation portion 56 in a same direction along the axis X50. This is an improvement over known pneumatic control devices such as hand levers, which take more space, are more fragile and are less intuitive to use.

Having a control valve 10 that is simple and intuitive to use is an advantage when the control valve is placed in a position outside the field of view of the driver, as is often the case in a truck cabin.

Furthermore, having a control valve 10 that is simple and intuitive to use is also an advantage in situations where it is likely that the user will be doing other tasks at the same time as he is actuating the control valve 10. In this example, when the driver actuates the control valve 10 to select a control state S2 or S3, his hands will be busy moving the steering column 30 or the steering wheel 32, because the corresponding degree of freedom of the position adjustment system remains unlocked only as long as the control valve 10 is actuated.

Even though the mechanical devices 36 and 38 can be actuated independently from each other, they both relate to the position adjustment system and thus have similar functions. It therefore makes sense to use a single control valve 10 to control them.

Using a single control valve 10, instead of providing a dedicated control valve for each mechanical device 36 and 38, takes much less space. This is important in a truck cabin where space is limited. This also simplifies the design of the pneumatic system 4.

Thanks to the control valve 10, the position adjustment system is easier to control and is ergonomically improved compared to existing solutions.

It is understood that these advantages apply as well to other embodiments, for example when the control valve 10 and/or the pneumatic circuit 4 are transposed to other kinds of industrial vehicles or, more broadly, to other industrial apparatuses.

According to an alternative example, the pneumatic circuit 4 can be used to disconnect electrical batteries of a truck carrying a tank containing hazardous materials, such as fuel. For safety reasons, the batteries must be disconnected before filling or emptying the tank, in order to avoid any accidental ignition. In that case, the circuit 4 is arranged so that the control valve 10 is able to command the connection or disconnection of groups of batteries. The first and second mechanical devices 36, 38 are then mechanical switches associated with leads of the batteries. The control valve 10 can then be located outside the truck cabin, for example near an opening of the tank.

Many other embodiments are however possible.

The embodiments and alternatives described above may be combined with each other in order to generate new embodiments of the invention.

The invention claimed is:

1. An industrial apparatus comprising a pneumatic system, a first mechanical device and a second mechanical device, the pneumatic system comprising:
   a first pneumatic actuator configured to command the first mechanical device;
   a second pneumatic actuator configured to command the second mechanical device; and
   a pneumatic control valve switchable between several states to command the first and second pneumatic actuators;
   wherein:
      the pneumatic control valve comprises an actuation portion, movable in translation between:
         a resting position, corresponding to a first state;
         a first pushed position, corresponding to a second state; and
         a second pushed position, corresponding to a third state; and
      wherein:
         the first pushed position corresponds to an intermediary position between the resting position and the second pushed position; and
         the pneumatic control valve is configured to oppose an increased mechanical resistance to displacement of the actuation portion when the actuation portion is moved from the first pushed position towards the second pushed position.

2. The industrial apparatus of claim 1, wherein the pneumatic control valve is adapted to selectively activate or inactivate the first and second pneumatic actuators depending on the selected state, respectively, by connecting at least one of the first or second pneumatic actuators with a compressed gas source of the pneumatic system or with an exhaust line of the pneumatic system.

3. The industrial apparatus of claim 1, wherein the first state corresponds to an inactivated state of both the first and second pneumatic actuators, wherein the second state corresponds to an activated state of the second pneumatic actuator and to an inactivated state of the first pneumatic actuator, and wherein the third state corresponds to an activated state of the first pneumatic actuator and to an inactivated state of the second pneumatic actuator.

4. The industrial apparatus of claim 1, wherein the control valve comprises:
   first and second outlet ports connected, respectively, to an input port of the first and second actuators;
   a supply port connected to a compressed gas source of the pneumatic system; and
   an exhaust port connected to an exhaust line of the pneumatic system.

5. The industrial apparatus of claim 1, wherein the control valve comprises a main body and a movable inner portion connected with the actuation portion, wherein the movable inner portion is configured to move by sliding inside an internal cavity of the main body, and wherein the movable inner portion comprises fluid conduction channels, so as to selectively connect together or obstruct some of the ports of the control valve, depending on the selected state of the control valve.

6. The industrial apparatus of claim 1, wherein the actuation portion is movable in translation along a translation axis which is a longitudinal axis of a main body of the control valve.

7. The industrial apparatus of claim 1, wherein the actuation portion comprises an outer surface configured to be actuated by hand or foot.

8. The industrial apparatus of claim 1, wherein the actuation portion is spring biased to return in the resting position when no outside actuation force is exerted on the actuation portion.

9. The industrial apparatus of claim 1, wherein the industrial apparatus is an industrial vehicle.

10. The industrial apparatus of claim 9,
    wherein the industrial vehicle comprises a steering column, a steering wheel, at least a first articulation and a second articulation;
    wherein the first articulation allows a pivoting movement of the steering column, relative to a fixed frame of the vehicle, around a respective first rotation axis;
    wherein the second articulation allows a tilting movement of the steering wheel relative to the steering column, around a second rotation axis; and
    wherein the first mechanical device is a locking mechanism of the first articulation and the second mechanical device is a locking mechanism of the second articulation.

11. The industrial apparatus of claim 10,
    wherein the first actuator is configured to unlock the locking mechanism of the first articulation when in an activated state, and to keep the locking mechanism locked when in an inactivated state; and
    wherein the second actuator is configured to unlock the locking mechanism of the second articulation when in an activated state, and to keep the locking mechanism locked when in an inactivated state.

12. The industrial apparatus of claim 9, wherein the control valve is in a driver cabin of the industrial vehicle.

13. An industrial vehicle comprising a pneumatic system, a first mechanical device and a second mechanical device, wherein:

the industrial vehicle comprises a steering column, a steering wheel, at least a first articulation and a second articulation;

the first articulation allows a pivoting movement of the steering column, relative to a fixed frame of the vehicle, around a respective first rotation axis;

the second articulation allows a tilting movement of the steering wheel relative to the steering column, around a second rotation axis; and the pneumatic system comprises:

a first pneumatic actuator configured to command the first mechanical device;

a second pneumatic actuator configured to command the second mechanical device; and a pneumatic control valve switchable between several states to command the first and second pneumatic actuators;

wherein:

the first mechanical device is a locking mechanism of the first articulation and the second mechanical device is a locking mechanism of the second articulation or the first mechanical device is a locking mechanism of the second articulation and the second mechanical device is a locking mechanism of the first articulation; and the pneumatic control valve comprises an actuation portion, movable in translation between:

a resting position, corresponding to a first state;

a first pushed position, corresponding to a second state; and a second pushed position, corresponding to a third state;

wherein the first pushed position corresponds to an intermediary position between the resting position and the second pushed position.

14. The industrial vehicle of claim 13, wherein the first actuator is configured to unlock the locking mechanism of the first articulation when in an activated state, and to keep the locking mechanism locked when in an inactivated state; and wherein the second actuator is configured to unlock the locking mechanism of the second articulation when in an activated state, and to keep the locking mechanism locked when in an inactivated state.

15. The industrial vehicle of claim 13, wherein the control valve is in a driver cabin of the industrial vehicle.

\* \* \* \* \*